April 18, 1967 W. R. FRYE 3,314,635
COMBINATION CUP AND BOTTLE HOLDER
Filed May 13, 1965 3 Sheets-Sheet 1
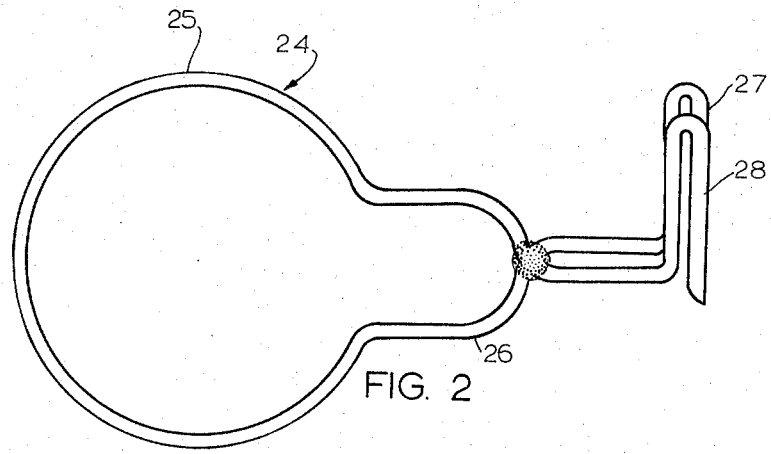
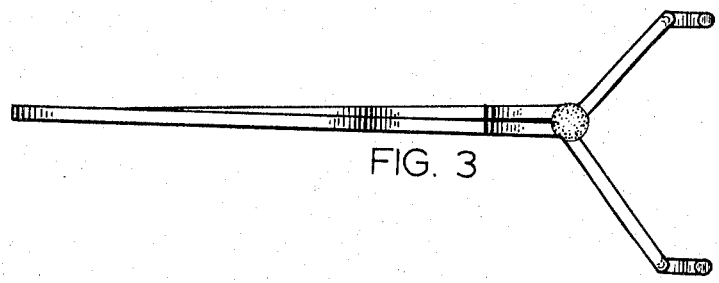
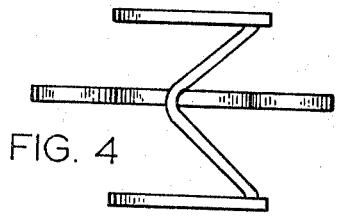
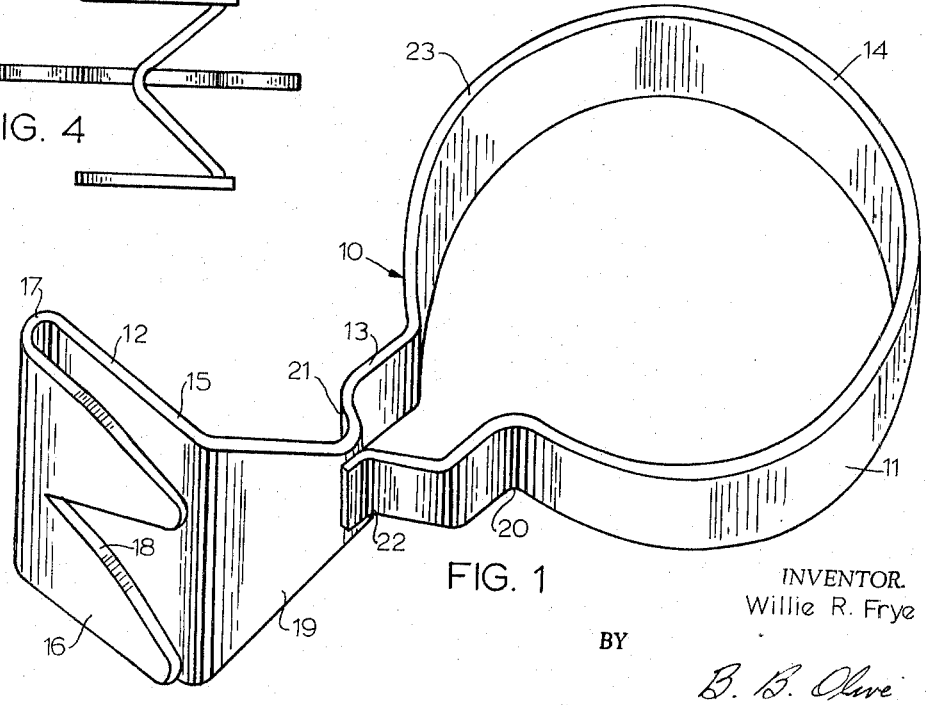
INVENTOR.
Willie R. Frye
BY
B. B. Olive
ATTORNEY April 18, 1967 W. R. FRYE 3,314,635
COMBINATION CUP AND BOTTLE HOLDER
Filed May 13, 1965 3 Sheets-Sheet 2

INVENTOR.
Willie R. Frye
BY
*B. B. Olive*
ATTORNEY

April 18, 1967 W. R. FRYE 3,314,635
COMBINATION CUP AND BOTTLE HOLDER
Filed May 13, 1965 3 Sheets-Sheet 3

INVENTOR.
Willie R. Frye
BY
B. B. Olive
ATTORNEY

United States Patent Office 3,314,635
Patented Apr. 18, 1967

3,314,635
COMBINATION CUP AND BOTTLE HOLDER
Willie R. Frye, 605 E. Beech St., Goldsboro, N.C. 27530
Filed May 13, 1965, Ser. No. 455,521
6 Claims. (Cl. 248—311)

This invention relates to a beverage holder for vehicles and, more particularly, to a holder mounted in a vehicle adapted to receive beverage containers such as bottles, cups and the like.

Various means have been devised for receiving and stabilizing liquid recepticles in vehicles. For the most part, the prior art teaches only the use of a tray as the receptacle receiver with improvements relating to the method of attaching the tray to the automobile and to means for steadying the beverage receptacle on the tray. Also, the tray is generally supplied by a seller of light foods and beverages and is promptly removed when the customer has finished with his meal for the reason that, to date, it has been too expensive for a vehicle owner to have a tray or plurality thereof for his own personal use.

Trays have been attached to the windows of vehicles, in the slots between the window glass and the inner or outer panel of the door, and on the mullion post which serves as one track for the window glass; however, these trays cannot remain indefinitely on the vehicle for the bulkiness thereof prevents the passenger from having access to the door and window handles, thus assuming that the trays are foldable and mounted in the interior of the car. It can easily be seen that the prior art does not teach a permanently mounted, inexpensive beverage holder for the interior of a vehicle.

Although the art teaches attachments to trays which steady a beverage bottle or cup while on a tray, it does not teach a beverage holder which is not in combination with a tray and which may become a permanent fixture on the vehicle while not occupying an excessive amount of space. It appears that the present invention satisfies the needs which existed in the prior art as will be pointed out below.

An object of this invention is to provide a beverage holder which may be detachably mounted on the inside of a vehicle's door.

Another object of this invention is to provide a beverage holder which may be substantially removed from the area adjacent a passenger by downwardly pivoting the same.

A further object of this invention is to provide a beverage holder which holds both a bottle and a cup without the aid of a tray.

A still further object of this invention is to provide a beverage holder having the cup holding element thereof being adapted to receive a cup of most any dimension.

Yet another object of this invention is to provide a beverage holder which is inexpensive to manufacture and is sturdy without being bulky.

These and other objects of the present invention will be described more fully in the following specification, claims and drawings, in which:

FIGURE 1 is a perspective view of the combination cup and bottle holder.

FIGURE 2 is a plan view of a second embodiment of this device.

FIGURE 3 is a front elevation of the second embodiment of this device.

FIGURE 4 is a right elevation of the second embodiment of this device.

In accordance with the present invention, there is provided a combination cup and bottle holder having a cup receiving element, an element which receives the neck of a bottle and a clasp which resides on a door panel, all being in an integral relationship.

Generally speaking, four embodiments of this invention are disclosed; all embodiments have a cup and bottle receiving means and a clasp. The first embodiment which is shown in FIGURE 1 discloses an integral, rigid structure having a circular, dimensionally stable band, a U-shaped appendix being an outward extension of the band and a clasp being a continuation of the U-shaped appendix; the clasp has had a V-shaped section removed therefrom thereby allowing it to straddle foreign objects. This embodiment may easily be made by stamping the same from a metal plate or the like and by welding one end of the metal strip to the body of the same thereby forming a loop which has a shape adapting it to receive a cup and bottle.

The second embodiment of this invention which is shown in FIGURES 2, 3 and 4 discloses a slender rod which comprises the entire structural frame. The design of this embodiment is substantially the same as that disclosed in the first embodiment; however, the second embodiment may be more economically constructed since it is made from a wire-like rod and since it consumes less material. The cup and bottle holding elements may easily be formed by hand or machine to accommodate a sup or a bottle, respectively. The rod forms a closed loop when two portions thereof are welded together at the vertex of the U-shaped appendix. Two extensions from this appendix form cooperating clasps which take the form of elongated U's and are adapted to receive a section of a door panel.

Figure 5:
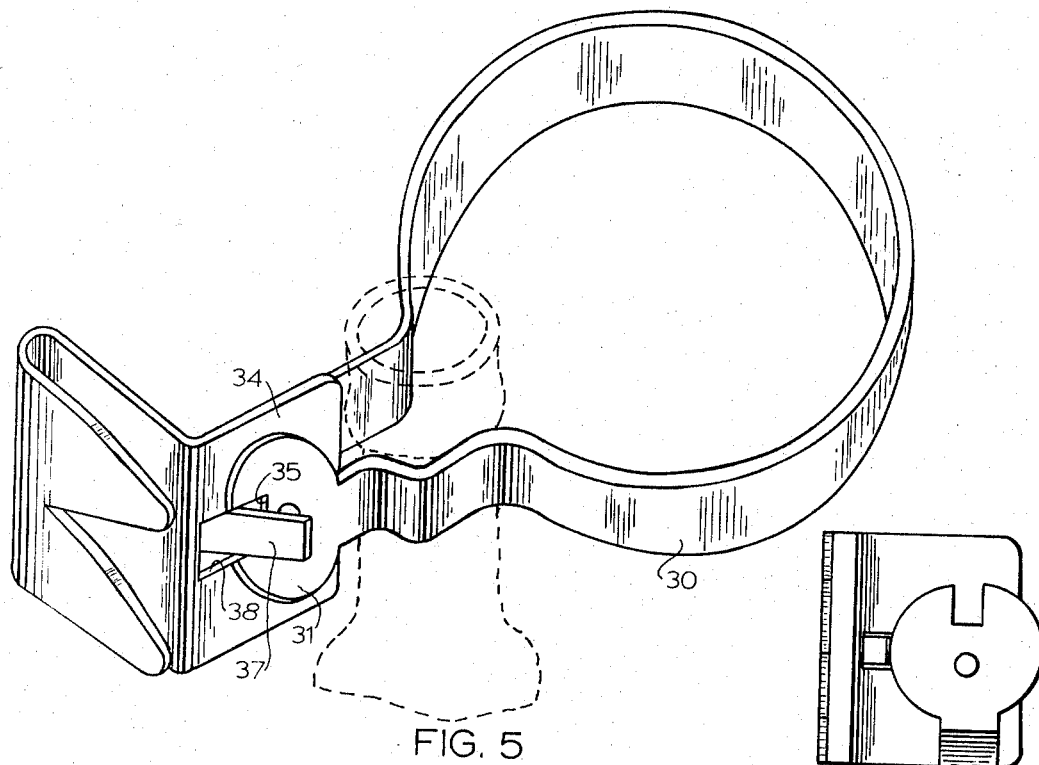
FIGURE 5 is a perspective view from the right side of a third embodiment showing the device receiving the neck of a bottle.
Figure 7:
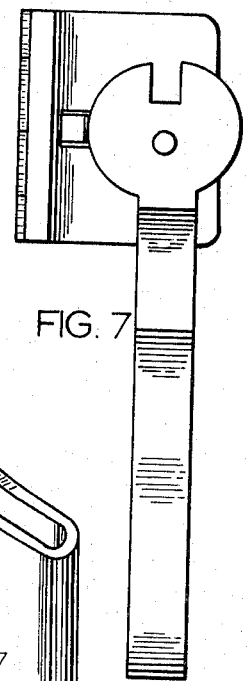
FIGURE 7 is an elevation of the third embodiment showing the cup and bottle receiving elements of the device in a recessed position.
Figure 6:
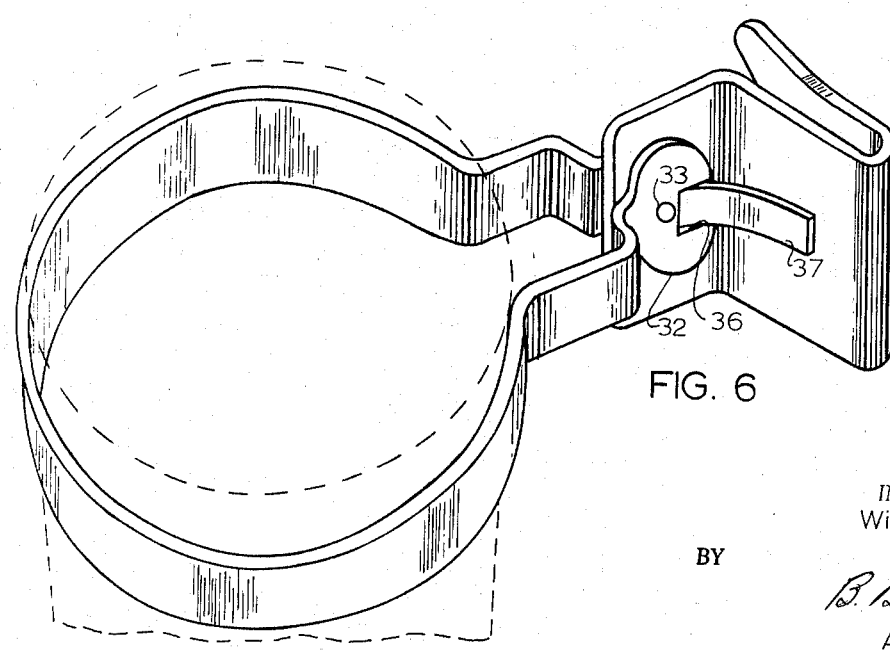
FIGURE 6 is a perspective from the left side of the third embodiment showing the device receiving a cup.
Figure 8:
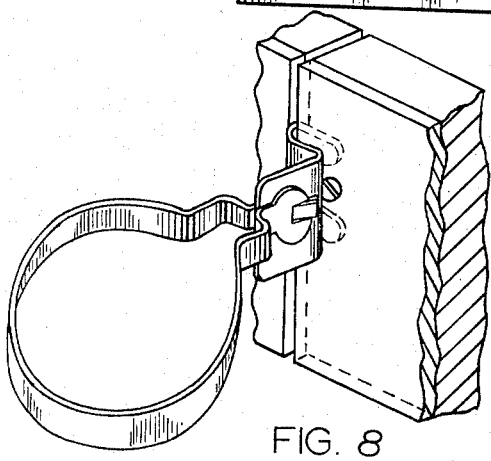
FIGURE 8 is a perspective view of the third embodiment showing the invention securely mounted on a door panel.

The third embodiment, which is shown in FIGURES 5, 6, 7 and 8, is identical to the first embodiment with the exception that the arms of the U-shaped appendix are extended from the vertex thereof and are pivotally mounted on a shaft which is located in an extension of the clasp. A leaf spring is mounted on the clasp and extends through a window in the extension of the clasp. The leaf spring locks the bottle and cup receiving elements of the loop in a usable position when it is received by an indentation in the extension of the arms which form the U-shaped appendix. When the leaf spring is pushed inwardly toward the clasp and consequently the door frame, the loop is free to be pivoted into a position of inactivity which is substantially parallel to the door frame.

Figure 10:
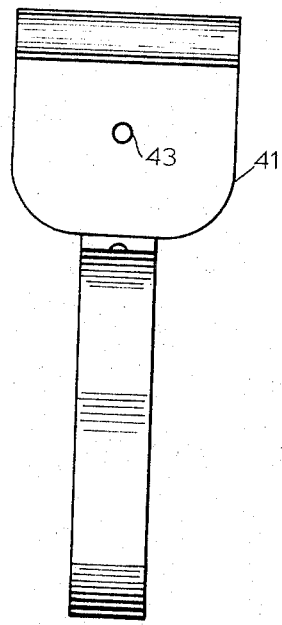
FIGURE 10 is a left elevation of the fourth embodiment.
Figure 9:
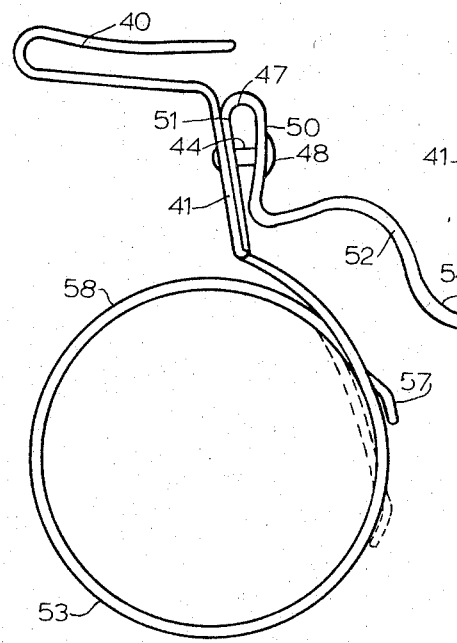
FIGURE 9 is a plan view of a fourth embodiment of the device which also illustrates an alternate size for the cup-receiving portion thereof.
Figure 11:
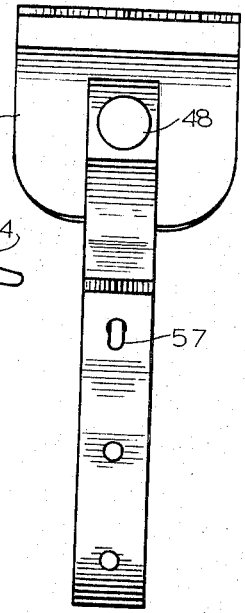
FIGURE 11 is a right elevation of the fourth embodiment.
Figure 12:
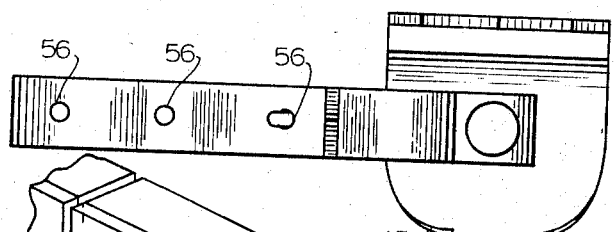
FIGURE 12 is a right elevation of the fourth embodiment showing the cup and bottle receiving portion thereof in a retracted position.
Figure 13:
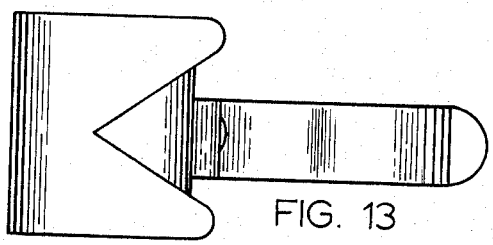
FIGURE 13 is a top view of the fourth embodiment.

The fourth embodiment which is illustrated in FIGURES 9, 10, 11, 12 and 13 has equivalent uses as the prior three embodiments although there is a structural difference. Also, the fourth embodiment has advantages which the other three do not have, that being the diameter of the cup receiving element of the loop may be adjusted to accommodate most any size cup and the bottle receiving element is located on the exterior of the loop. This embodiment includes three separate pieces, one forming the clasp and flange, the second forming the bottle receiving element, a tension spring and the adjustable cup receiving element, and the third functioning as a stake which rigidly resides in the flange of the clasp and which rotatably receives the container receiving elements. Portions of the edge of the flange are bent into a position away from the general plane of the flange while portions are not thereby forming a pocket which receives and locks the container holding elements of the device in a relatively rigid and serviceable position. The cup receiving element is formed from a metal, or some equivalent which has elastic properties, band and assumes the shape of a ring. The ring is maintained in a closed position by having one end of the band adapted to be securely held by a slot, a plurality of which are located in a cooperating position in the side of the band. The spring is formed by an extension of the band which is doubled back upon itself thereby tracing a U with the leg portions thereof. The spring is pivotally mounted on the stake which is rigidly attached to the flange. The bottle receiving element is located on the outside of the ring and is itself a leaf spring and is comprised of an extension of the legs of the U-shaped spring. The clasp is shaped like an elongated U for grasping a door panel and has a flange which extends away from the parallel planes in which the leg members of the U reside. As mentioned above, the flange receives the stake about which the container holding elements are pivoted. The outer leg of the U of the clasp has had a V-shaped section removed therefrom thereby adapting this leg to be inserted between the door panel and the door and straddle a rivet which may hold the aforementioned door and panel together.

As previously stated, this invention is comprised of several embodiments, one of which is disclosed in FIGURE 1. The combination bottle and cup holder is denoted as numeral 10. Holder 10 is made from a continuous, substantially rigid band 11 which comprises a clasp 12, a bottle receiving element 13, and a cup receiving element 14, portions 13 and 14 forming a loop 20. Clasp 12 is in the shape of an elongated U having legs 15 and 16 and a connecting vertex 17. Leg 16 has a V-shaped indentation 18 which serves to straddle rivets (not shown) which hold a door panel to a door (shown partially in FIGURE 8). Extending angularly away from leg 15 is a flange 19 which serves as a means for connecting loop 20 with clasp 12. Loop 20 begins with the bottle holding element 13 being also U-shaped in design which is formed by an extension 21 of flange 19 and by the end 22 of loop 20. Extension 21 and end 22 also comprise the legs of this U. End 22 of loop 20 is rigidly fastened to the extremity of flange 19 by any convenient means such as by welding, by glueing and the like. Annular band 23 which serves as the cup receiving element 14 is an integral continuation of extension 21 and end 22.

The second embodiment having a shape similar to that of the first embodiment is fabricated from a single length of a rod 24 which may be of any material so long as it has sufficient tensile properties. This embodiment has an annular ring 25 for receiving a cup, a U-shaped appendix 26 for receiving a bottle, said appendix 26 having the vertex thereof formed by superposing one segment of rod 24 on a corresponding segment and rigidly binding these segments together at their points of contact. Rod 24 forms clasps 27 and 28 which are in the shape of an elongated U. Clasps 27 and 28 are spacially removed so as to insure vertical stability and cooperate to function similarly to clasp 12 of the first embodiment.

The third embodiment is substantially identical to the first embodiment with the exception that this one is adapted to be pivoted into a position which is downward and away from the occupant using the same. Loop 30 has its ends in the shape of discs 31 and 32 which are coacting and are rotatably mounted on shaft 33 which extends from the outer surface of disc 32 through flange 34 and onto the outer surface of disc 31. Discs 31 and 32 have slots 35 and 36 respectively, and receive a leaf spring 37 in the said slots which extends through a window 38 being located in flange 34 thereby cooperating to lock loop 30 in a beverage receiving position. To fold loop 30 downwardly or upwardly if desired, leaf spring 37 is manually pushed away from loop 30 until it has cleared slots 35 and 36 whereupon an external, directional force is applied to loop 30 which ultimately positions it against the door frame (not shown in FIGURES 5, 6 and 7).

The fourth embodiment of this invention employs substantially the same concept as the other embodiments; however, it is structurally different and is also improved thereupon. Clasp 40 is U-shaped and is of the same design and function as the clasp of the first embodiment. Flange 41 which is an extension of clasp 40 is provided with an opening 43 which receives a stake 44; also, flange 41 has a portion 45 of its extending periphery curled in a manner to protrude from the surface thereof thereby creating a pocket 46. A spring 47 is rotatably mounted on strake 44 and is held thereon by the roundhead 48. Spring 47 is U-shaped in design and has legs 50 and 51 which form a bottle receiving clamp 52 and an adjustable, annular ring 53 for receiving a cup, respectively. Clamp 52 is comprised of a leaf spring 54 which is an extension of leg 50 and an external section 55 of annular ring 53; this arrangement allows the user to utilize both the bottle holding and the cup holding features of this invention simultaneously. Annular ring 53 is a continuous extension of leg 51 and is provided with slots 56 along its length for receiving a tongue 57 which is a narrowed and raised element positioned at the end of the band or rod 58 which comprises annular ring 53. Tongue 57 is adapted to be received by any of the slots listed as numeral 56; thus, this interchangeability equips the device with a means for receiving a beverage cup of most any size.

Having described the invention, what is claimed is:

1. A holder for supporting beverage containers in automobiles comprising a U-shaped clasp for grasping an area of an automobile door panel, said clasp having a leaf spring rigidly attached thereto and extending outwardly therefrom and having an integral flange extending in a direction away from said clasp, said flange being provided with a rigidly mounted shaft, and a loop band member pivotally mounted on said shaft and having an indentation for receiving said leaf spring, said band member having a first section bent to support a beverage bottle by its neck and a second section forming an extension of said first section and bent to support a tapered cup by its side.

2. A holder for supporting containers in automobiles comprising a U-shaped clasp having a first leg and a second leg with said legs being joined thereby forming a vertex for grasping an area of an automobile door panel; a leaf spring rigidly secured to said second leg and extending angularly away therefrom; a flange being an integral extension of said second leg and being provided with a window through which said leaf spring passes, said flange being provided with a shaft; and a loop band member having an extension which is pivotally mounted on said shaft, said extension having an indentation geometrically coinciding with said window and receiving said leaf spring in a locking relationship, said band member having a first section forming a continuation of said band member extension and bent to support a beverage bottle by its neck, said band member having a second section forming an integral extension from said first section and bent to support a tapered cup by its side.

3. The holder of claim 2 wherein said first leg of said U-shaped clasp is V-shaped to straddle panel fasteners.

4. A holder for supporting containers in automobiles comprising a U-shaped clasp having first and second opposed legs including a vertex portion in the second leg for grasping an automobile door panel area; a flange being an integral part of said second leg and extending angularly away from said second leg, said flange being provided with a shaft which is rigidly mounted thereon, said flange having a pocket formed by bending portions of the periphery of said flange into a position away from the general plane in which said flange resides; and a band having tensile properties along the horizontal axis and being dimensionally stable along the vertical axis, said band being bent to form a substantially U-shaped spring which is pivotally mounted on said shaft, said U-shaped spring being comprised of a first leg and a second leg, said first leg being adapted to reside in said pocket and being of sufficient length to form a ring which is capable of supporting a tapered cup by its side, said second leg being disposed from said first leg and being extended in the same general direction of and cooperating with a length of said first leg to support a beverage bottle by its neck.

5. The holder of claim 4 wherein said ring is formed from a continuation of said first leg of said U-shaped spring, said leg having a plurality of spaced openings along its length and having a tapered terminal section forming a crimped tongue, said tongue being adapted to be received by any of said openings thereby forming an adjustable ring for supporting a cup by its tapered side.

6. The holder of claim 5 wherein said first leg of said U-shaped clasp is V-shaped to straddle panel fasteners.

References Cited by the Examiner
UNITED STATES PATENTS

| | | | |
|---|---|---|---|
| 2,086,355 | 7/1937 | Eansor | 248—313 |
| 2,242,833 | 5/1941 | Nibur | 248—315 |
| 2,360,224 | 10/1944 | Hannaford | 215—1 |
| 2,754,078 | 7/1956 | Hoger et al. | 248—311 |

CLAUDE A. LE ROY, *Primary Examiner.*

J. F. FOSS, *Assistant Examiner.*